United States Patent [19]
Takahashi et al.

[11] Patent Number: 6,117,614
[45] Date of Patent: Sep. 12, 2000

[54] PHOTOSENSITIVE GLASS PASTE

[75] Inventors: Kenta Takahashi, Toyosaka; Akira Awaji, Toyoura-machi, both of Japan

[73] Assignee: Shipley Company, L.L.C., Marlborough, Mass.

[21] Appl. No.: 09/181,236

[22] Filed: Oct. 28, 1998

[30] Foreign Application Priority Data

Nov. 4, 1997 [JP] Japan ..................................... 9-301641

[51] Int. Cl.⁷ .............................. G03C 1/725; G03C 1/76
[52] U.S. Cl. ......................... 430/270.1; 430/18; 430/325
[58] Field of Search ................................ 430/270.1, 325, 430/18; 313/567; 445/24

[56] References Cited

U.S. PATENT DOCUMENTS

| | | | |
|---|---|---|---|
| 4,526,874 | 7/1985 | Grabowski geb. Mar | 501/77 |
| 4,692,662 | 9/1987 | Wada et al. | 313/493 |
| 5,116,704 | 5/1992 | Kwon | 430/3 |
| 5,578,533 | 11/1996 | Manabe et al. | 501/17 |
| 5,639,579 | 6/1997 | Hayashi et al. | 430/7 |
| 5,840,465 | 11/1998 | Kakinuma et al. | 430/270.1 |

*Primary Examiner*—John S. Chu
*Assistant Examiner*—Yvette M. Clarke
*Attorney, Agent, or Firm*—Christine C. O'Day; Peter F. Corless; Edwards & Angell, LLP

[57] ABSTRACT

An object of the invention is to provide a photosensitive glass paste for forming barriers for a PDP, which can be exposed to a great depth, and patterned with high accuracy without being adversely affected by oxygen. The present photosensitive glass paste comprises:

a photosensitive resin material containing a resin-based material which can be cured by an acid and a photo-acid-generating agent; and an inorganic material containing a glass powder, the glass powder having the following composition in terms of oxides:

PbO: 32 to 42 wt %

$Bi_2O_3$: 18 wt % or less

ZnO: 8 to 12 wt %

$B_2O_3$: 15 to 25 wt %

$SiO_2$: 10 to 25 wt %

$Al_2O_3$: 5 wt % or less, and $Na_2O+K_2O+Li_2O$: 5 wt % or less wherein a difference between a refractive index of said photosensitive resin material and a refractive index of said inorganic material is within 0.2.

14 Claims, No Drawings

PHOTOSENSITIVE GLASS PASTE

BACKGROUND OF THE INVENTION

The present invention relates to a glass paste having photosensitivity, and more specifically to a photosensitive glass paste employed for forming barriers (also referred to as ribs or barrier ribs) for use in a plasma display panel (PDP).

Conventionally, barriers for a PDP were formed initially by a screen printing method. According to this method, however, printing is required to be repeatedly carried out, which involves difficult alignment operations and makes the whole process complicated, and further the resolution obtained is limited, which makes it difficult to form a high definition panel by the screen printing method. Therefore, recently, a sand blasting method has become a mainstream method employed in making barriers for the PDP.

However, although the sand blasting method is excellent in the accuracy of machining, it has other drawbacks: the process is complicated and time-consuming, the use of abrasive materials makes it difficult to perform contamination control, and it is difficult to form a high definition panel by the sand blasting method. Under these circumstances, a photosensitive paste method has come to attention in the art.

The photosensitive paste method is carried out by an apparently very simple process. That is, a substrate is coated with a photosensitive glass paste prepared by mixing a photosensitive resin material and an inorganic material containing glass having a low melting point. Then, patterning of barriers is carried out by a photolithographic process. Finally, firing of the patterned barriers is carried out. The photosensitive paste method, however, suffers from the problem that since the paste is a mixture of a resin material for imparting photosensitivity thereto and an inorganic material including a glass having a low melting point, scattering of light occurs at an interface between these materials, which produces unnecessarily exposed portions of the photosensitive glass paste.

To solve this problem, there have been proposed a method of mixing the photosensitive glass paste with a black pigment (Japanese Provisional Patent Publication (Kokai) No. 6-144871) and a method of mixing the paste with an ultraviolet absorber and at the same time using a resin having a high photosensitivity and a high resolution (Japanese Provisional Patent Publication (Kokai) No. 8-50811).

The former, however, has the inconvenience that the optical transmittance of the resulting glass paste is markedly reduced and light cannot reach a desired depth, so that it is required to repeatedly carry out the process of alignment→coating→exposure→development, which extremely degrades manufacturing efficiency or productivity. Although, the latter provides some improvement in the manufacturing efficiency, it suffers from another problem that its resin per se is adversely affected by oxygen during the exposure of the glass paste to ultraviolet rays.

SUMMARY OF THE INVENTION

It is an object of the invention to provide a photosensitive glass paste for forming barriers for a PDP, which can be exposed to a great depth, and patterned with high accuracy without being adversely affected by oxygen.

The present inventors have studied intensively in order to solve the above problem, and as a result of their study they have found that the object can be attained by inventively determining a suitable composition of a glass with a low melting point and selecting an appropriate resin material. The present invention has been completed based on this finding.

That is, the present invention provides a photosensitive glass paste comprising:

a photosensitive resin material containing a resin-based material which can be cured by an acid and a photo-acid-generating agent; and an inorganic material containing a glass powder, the glass powder having the following composition in terms of oxides:

PbO: 32 to 42 wt %
$Bi_2O_3$: 18 wt % or less
ZnO: 8 to 12 wt %
$B_2O_3$: 15 to 25 wt %
$SiO_2$: 10 to 25 wt %
$Al_2O_3$: 5 wt % or less, and
$Na_2O+K_2O+Li_2O$: 5 wt % or less, wherein a difference between a refractive index of the photosensitive resin material and a refractive index of the inorganic material is within 0.2. The term refractive index of the photosensitive resin material means a refractive index of the photosensitive resin material in the state of a film formed on a substrate by evaporating a solvent thereof, while that of the inorganic material means a refractive index of the inorganic material which is melted and solidified. Further, the refractive index of photosensitive resin material is measured by ellipsometry, while that of an inorganic material by a method using a heavy solution.

Preferably, the difference between a refractive index of the photosensitive resin material and a refract ive index of the inorganic material is within 0.1, since the scattering of light at an interface between these materials is further decreased.

The "resin-based material which can be cured by a n acid" includes a resin-based material comprised of a crosslinking agent having an N-methylol structure, e.g. an amino resin, such as a urea resin and a melamine resin, and a resin having phenolic hydroxyl groups or carboxyl groups; a resin-based material comprised of the above crosslinking agent and an epoxy resin and a phenolic resin; and a resin-based material comprised of the above crosslinking agent, and a copolymer having a hydroxystyrene structure formed with p-hydroxystyrene and p-acetoxystyrene, the resin-based materials each having a property of being cured by an acid.

Examples of the above-mentioned compounds which can be used according to the invention include, as to the "crosslinking agent having an N-methylol structure", compounds mentioned in Japanese Provisional Patent Publication (Kokai) No. 4-163552, at page 3, upper left column, lines 5–16, and as to the resins and the polymers, compounds mentioned in the same publication, at page 3, from upper left column, line 17 to lower left column, line 7, and at the same page, from lower left column, line 18 to lower right column, line 7 (resins having phenolic hydroxyl groups), compounds mentioned in the same publication, at page 3, lower right column, lines 8–14 (resins having carboxyl groups), compounds mentioned in the same publication, at page 3, lower right column, lines 15–19 (epoxy resins), and compounds mentioned in the same publication, at page 3, lower left column, lines 8–17 (copolymers having a hydroxystyrene structure).

Further, the term "photo-acid-generating agent" means a compound which generates an acid when exposed to irradiation of light, and a lot of well known compounds and mixtures thereof may be employed. Examples of the compounds and mixtures are disclosed in Japanese Provisional Patent Publication (Kokai) No. 4-163552, at page 3, from lower right column, the bottom line to page 5, upper left column, line 2. The photo-acid-generating agent may be employed in combination with a sensitizer for enhancing acid-generating efficiency as necessary, examples of which are mentioned in the same publication, at page 5, from upper left column, line 6 to upper right column, line 6.

On the other hand, the inorganic material may contain, in addition to a glass powder, a ceramic component as a factor forming skeletons of barriers, such as quartz, periclase, spinel, orthoclase, albite, anorthite, silimanite, mullite, calcite, and the like, since the refractive indexes of these materials are within a range of 1.50 to 1.75 and hence they do not hinder the object of the present invention. In combining any of these ceramic components with a photosensitive resin material, the former may be selected as required such that the refractive index of the latter is within the above-mentioned optimal range.

Preferably, the heavy metal components PbO, $Bi_2O_3$ and ZnO in the composition of the glass powder are mixed in respective amounts of 32–42 wt %, 18 wt % or less, and 8–12 wt %. These are components for adjusting the refractive index and the melting point of the inorganic material. If the content of any of these components exceeds its upper limit, the refractive index of the inorganic material becomes too large, whereas if the same falls short of its lower limit, the melting point becomes too high. Further, $Bi_2O_3$ is expensive and hence if it is used in an amount in excess of its upper limit, the manufacturing costs of the photosensitive glass paste are increased, and if ZnO is used in an amount in excess of its upper limit, the crystallization of the inorganic material occurs. Preferably, $B_2O_3$, $SiO_2$ and $Al_2O_3$ are mixed in respective amounts of 15–25 wt %, 10–25 wt %, and 5 wt % or less. Among these components, $B_2O_3$ and $SiO_2$ are components for forming a basic matrix of the inorganic material. If the contents of $B_2O_3$ and $SiO_2$ exceed their upper limits, the melting point of the inorganic material becomes too high, whereas if the same falls short of their lower limits, the durability of the inorganic material is degraded. $Al_2O_3$ is effective in increasing the durability of the inorganic material and at the same time contributes to preventing crystallization of the same and hence it is desired that $Al_2O_3$ is mixed in such an amount close to but not in excess of the aforementioned range. Preferably, alkaline components ($Na_2O+K_2O+Li_2O$) are mixed in an amount of 5 wt % or less. These components contribute to lowering the melting point of the inorganic material. However, if the content thereof exceeds its upper limit, the durability of the inorganic material is degraded. The use of alkaline components is often avoided since they are considered to cause gelation of a main component resin of the photosensitive resin material. However, this drawback can be easily overcome by adding an anti-gelling agent to the photosensitive resin material and hence presents no serious problem. The anti-gelling agent added in an amount of 0.1 to 35 wt % based on the weight of the inorganic material is sufficient for this purpose. As the anti-gelling agent which can be used according to the invention, there may be mentioned Disperbyk-160, -161, -162, -163, -164, -166, -170, -180, -182, -110, -115, available from BYK-Chemie GmbH.

In the present invention, the blending ratio of the photosensitive resin material and the inorganic material is in a range of 50–95% [by weight; Inorganic material/(inorganic material+photosensitive resin material)], and more preferably 60–90% (same as above), since if the blending ratio is less than 50%, the density of the resulting composition after firing becomes so low that the composition cannot provide barriers having a sufficient strength, whereas if the blending ratio is more than 95%, it is difficult to effect the patterning on the glass paste.

Further, as the photosensitive resin material, there is suitably used one containing a photo-acid-generating agent and a crosslinking agent each in an amount of 0.1–25 wt %, preferably 0.5–10 wt %, based on the photosensitive resin.

The photosensitive glass paste according to the present invention is prepared first by dissolving a predetermined amount of a photosensitive resin material appropriately selected from the above-mentioned suitable compounds in a suitable solvent to thereby make a solution (concentration of the photosensitive resin material: 20–60 wt %), then adding to the solution a predetermined amount of an inorganic material prepared by a predetermined procedure and various kinds of additives, which may be employed as desired, and homogeneously dispersing the added components in the solution by using a three-roll mill to form a paste, which is used as a photosensitive glass paste of the present embodiment.

The solvent for the above solution may be selected as required from among known components, such as ethylene glycol, ethylene glycol monoethyl ether acetate, ethyl lactate, butyl acetate, methyl-3-methoxypropionate, ethyl-3-ethoxypropionate, propylene glycol monomethyl ether acetate, 3-methoxy butyl acetate, and methyl-n-amyl ketone.

The glass powder having a low melting point may be prepared by a conventional procedure. That is, powders of raw materials are prepared in respective predetermined amounts and mixed with each other. Then, the mixture is placed into a suitable melting pot and melted therein (at temperatures in a range of 900 to 1,200° C.), followed by being cooled and crushed by conventional means. Preferably, the glass powder employed is removed of particles smaller than 1 μm in particle size so as to prevent scattering of light during exposure of the glass paste.

Now, an example of a suitable use of the photosensitive glass paste according to the present invention will be described hereafter.

First, a photosensitive glass paste containing the above components is coated on a substrate which has necessary members such as electrodes formed thereon in advance, by suitable coating means, e.g. a spin coater, a slot coater, a roll coater or the like, and dried to form a paste coating. The thickness of the paste coating can be adjusted through selection of coating means and the viscosity of the paste. Then, the dried paste coating is selectively exposed to light by a conventinal photolithographic process, and then developed to thereby eliminate uncured portions (negative pattern) to form original barriers having a predetermined pattern. As a source of light for the exposure, there may be used ultraviolet rays, an electron beam, X-rays, etc., but according to the paste of the present invention, a light source generally employed at present for the photolithographic process, that is, ultraviolet rays are sufficient to attain the object. Conditions of the exposure may be selected as required according to the thickness of the coating.

Further, according to the paste of the invention, no special developer is required and hence it is possible to employ any of generally used developers, e.g. inorganic alkalis, such as sodium hydroxide, potassium hydroxide, sodium silicate, sodium metasilicate, sodium phosphate, sodium hydrogenphosphate, sodium carbonate, sodium hydrogencarbonate and the like; ammonia; amines such as n-propylamine, di-n-propylamine, di-n-butylamine, methyldiethylamine, collidine, piperidine, piperazine, triethylenediamine, pyrrole, 2,5-dimethylpyrrole and the like; alcohol amines such as dimethylethanolamine, triethanolamine, diethylhydroxylamine and the like; quaternary ammonium such as tetramethylammonium hydroxide, tetraethylammonium hydroxyde, 2-hydroxyethyl trimethylammonium hydroxyde and the like.

If it is required to coat the paste more than once due to limitations of the exposure, the above process of coating→drying→exposure may be repeatedly carried out a predetermined number of times, and then the resulting coating can be developed.

Finally, the substrate having patterned original barriers formed thereon is fired in a furnace to thereby form barriers. The firing may be carried out at a temperature of 450–580° C. for approximately 10–90 minutes.

DESCRIPTION OF THE PREFERRED EMBODIMENTS

The present invention will be described in further detail based on the following examples, but, it should be noted that the present invention is by no means limited to these examples.

EXAMPLES

First, as an inorganic material, a glass powder having a low melting point was prepared, which has the following composition:

PbO: 37 wt %
$Bi_2O_3$: 18 wt %
ZnO: 10 wt %
$B_2O_3$: 20 wt %
$SiO_2$: 10 wt %
$Al_2O_3$: 2 wt %, and
$Na_2O+K_2O+Li_2O$: 3 wt %

Physical characteristics of the above inorganic material are as follows:

(1) glass transition temperature:
 402° C.
(2) yield point:
 443° C.
(3) coefficient of thermal expansion:
 92×10/° C.
(4) refractive index :
 1.68 (by a method using a heavy solution. The same applies hereinafter), and
(5) specific gravity:
 4.54

It was confirmed that the temperatures of the physical characteristics (1) and (2) were below a desired firing temperature of 580° C., and hence satisfied requirements of the inorganic material for forming barriers.

Next, a copolymer of methyl methacrylate (MMA) and methacrylic acid (MAA) (wherein a molar ratio of one monomer to the other was 1:1) was prepared as a photosensitive resin material. The refractive index of the photosensitive resin material was 1.57 (measured by means of MOSS ESVG, available from SOPRA Co. This applies to the same kind of measurements mentioned hereinafter).

The photosensitive resin material was dissolved in a solvent of propylene glycol monomethyl ether acetate, to which was added the inorganic material prepared as descried above, and the resulting mixture is mixed by a three-roll mill, thereby preparing a coating paste (blending ratio was photosensitive resin material: 14.7 wt %; inorganic material: 27.3 wt %; and solvent: 58.0 wt %).

The coating paste was coated on a 10-by-10 centimeter glass substrate (soda lime glass) by means of a spin coater to form a coating thereon. That is, the rotational speed of the spin coater and the viscosity of the coating paste were adjusted as required to prepare samples having thicknesses of 15 μm, 30 μm and 50 μm, respectively. The samples were removed of the solvent and dried by means of a hot plate at a temperature of 90° C. for 5 minutes to thereby form three kinds of specimens. The coating thicknesses of the specimens were measure by means of a "stylus-type step-sensing coating thickness meter" (Dektak., available from SLOAN Technology Corp.).

The optical transmittance at a wavelength of 400 nm of each specimen was measured by means of an "ultraviolet/visible spectrophotometer" (V-3000, available from Hitachi Ltd.) by using the substrate used for making respective specimens, as the reference. Results of the measurement are shown in TABLE 1.

COMPARATIVE EXAMPLES

Comparative Examples are distinguished from Examples in that an inorganic material having a conventional composition (PbO: 72 wt %; $B_2O_3$: 14 wt %; and $SiO_2$: 14 wt %) was used, the obtained inorganic material having the following physical characteristics:

(1) glass transition temperature: 403° C.
(2) yield point: 432° C.
(3) coefficient of thermal expansion: 85×10/° C.
(4) refractive index: 1.84; and
(5) specific gravity: 5.48 and that the coating liquid was prepared to have a composition of photosensitive resin material: 13.5 wt %; inorganic material: 31.5 wt %; and solvent: 55.0 wt % (so as to make a volume ratio of the photosensitive resin material to the inorganic material in the resulting coating equal to that of Examples). The results of the measurement of the optical transmittance of Comparative Examples are shown in TABLE 1.

TABLE 1

| coating thickness | optical transmittance (%) | |
| --- | --- | --- |
| (μm) | Examples | Comparative Examples |
| 15 | 73.5 | 47.2 |
| 30 | 54.1 | 22.3 |
| 50 | 35.9 | 8.2 |

As is obvious from TABLE 1, the photosensitive glass paste according to the present invention has an optical transmittance more than four times as large as that of a prior art photosensitive glass paste even when the coating has a thickness of 50 μm.

As a result, according to the photosensitive glass paste of the present invention, scattering of light can be effectively reduced to a very low level, which makes it possible to carry out the exposure to a great depth of the glass paste and the patterning of barriers with high accuracy. Further, it is possible to markedly simplify the process of forming barriers for PDP's.

What is claimed is:

1. A photosensitive glass paste comprising:
 a photosensitive resin material containing a resin-based material which can be cured by an acid and a photo-acid-generating agent; and an inorganic material including a glass powder having a low melting point, said glass powder containing oxides of PbO, $Bi_2O_3$, ZnO, $B_2O_3$, $SiO_2$, $Al_2O_3$, $Na_2O+K_2O+Li_2O$, wherein each of the oxides is present in the following amounts:

PbO: 32 to 42 wt %

$Bi_2O_3$: 1 to 18 wt %

ZnO: 8 to 12 wt %

$B_2O_3$: 15 to 25 wt %

$SiO_2$: 10 to 25 wt %

$Al_2O_3$: 1 to 5 wt %, and $Na_2O+K_2O+Li_2O$: 1 to 5 wt % wherein a difference between a refractive index of said photosensitive resin material and a refractive index of said inorganic material is within 0.2.

2. The photosensitive glass paste according to claim 1, wherein said difference between said refractive index of said photosensitive resin material and said refractive index of said inorganic material is within 0.1.

3. The photosensitive glass paste according to claim 1, wherein the resin-based material comprises a crosslinking agent having an N-methylol structure, and a resin having phenolic hydroxyl groups or carboxyl groups, the photo-acid-generating agent being selected from the group consisting of organic halides and photo-sulfonic acid-generating compounds.

4. The photosensitive glass paste according to claim 3, wherein a blending ratio of the photosensitive resin material to the inorganic material is in a range of 1:1 to 19:1 by weight, said photosensitive resin material containing said photo-acid-generating agent and said crosslinking agent each in an amount of 0.1 to 25 wt % based on a resin.

5. The photosensitive glass paste according to claim 1, containing an anti-gelling agent in an amount of 0.1 to 35 wt % based on the inorganic material.

6. A method for preparing a plasma display panel, comprising:

applying a coating layer of a photosensitive glass paste of claim 1 onto a plasma display panel substrate;

selectively exposing the coating layer to activating radiation; and developing the exposed coating layer to provide a relief image of the photosensitive glass paste.

7. The method of claim 6 wherein the substrate has electrodes formed thereon.

8. The method of claim 6 wherein the substrate with relief image is thermally treated.

9. The method of claim 6 wherein the substrate with relief image thereon is heated at about 450–580° C. for approximately 10–90 minutes.

10. The method of claim 6 wherein the relief image forms barrier ribs of a plasma display panel.

11. A plasma display panel substrate having thereon a photosensitive glass paste of claim 1.

12. A process for making a plasma display panel comprising forming a relief image of the photosensitive glass paste on the substrate of claim 11.

13. The process for making the plasma display panel of claim 12 further comprising thermally treating the photosensitive glass paste.

14. The process for making the plasma display panel of claim 12 further comprising forming electrodes on the substrate.

* * * * *